(12) United States Patent
Andrews et al.

(10) Patent No.: US 6,596,644 B1
(45) Date of Patent: Jul. 22, 2003

(54) METHODS FOR FORMING FEATURES IN POLYMER LAYERS

(75) Inventors: John R. Andrews, Fairport, NY (US); Cathie J. Burke, Rochester, NY (US); Roger G. Markham, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/683,542

(22) Filed: Jan. 16, 2002

(51) Int. Cl.$^7$ ............................................ H01L 21/302
(52) U.S. Cl. .......................................... 438/710; 347/65
(58) Field of Search ............................... 347/63, 65, 68, 347/20, 45; 438/710

(56) References Cited

U.S. PATENT DOCUMENTS 6,305,790 B1 * 10/2001 Kawamura et al. ........... 347/65
6,325,493 B1 * 12/2001 Yamaguchi ................... 347/63
6,336,714 B1 * 1/2002 Kawamura et al. ........... 347/65
6,336,716 B1 * 1/2002 Sakamaki et al. ............. 347/68
6,343,855 B1 * 2/2002 Sakamaki et al. ............. 347/68
6,365,323 B1 * 4/2002 Narang et al. ................. 347/20
6,378,199 B1 * 4/2002 Yoshinuma et al. ........ 174/261
6,382,777 B1 * 5/2002 Yamaguchi et al. .......... 347/45
6,447,984 B1 * 9/2002 Tatsumi et al. ............. 156/230

* cited by examiner

*Primary Examiner*—John F. Niebling
*Assistant Examiner*—Olivia Luk
(74) *Attorney, Agent, or Firm*—Oliff & Berridge, PLC (57) ABSTRACT

12 Methods of forming features in polymeric materials by laser ablation techniques alone, or by the combined use of laser ablation techniques and photolithography, are disclosed. The methods can be used to pattern non-photosensitized materials, as well as photosensitized materials. The patterned features can have different shapes, dimensions and aspect ratios in the same polymer layer. Structures including the patterned features can include multiple layers formed of photosensitized and/or non-photosensitized polymer materials.

31 Claims, 6 Drawing Sheets

METHODS FOR FORMING FEATURES IN POLYMER LAYERS

BACKGROUND OF THE INVENTION

1. Field of the Invention

This invention is directed to methods for forming structures for microfluidic applications, and also to structures and devices formed by the methods.

2. Description of Related Art

Structures for microfluidic applications include passages in which fluids are contained and flowed. In order to provide controlled, uniform flow through the passages, it is important that the passages have well-defined characteristics.

One exemplary type of structure that includes fluid flow passages is the ink jet print head. Ink jet print heads typically include a base, an intermediate layer formed over the base, and a cover formed over the intermediate layer. The intermediate layer and cover form channels and nozzles for flowing and discharging the ink onto a recording medium to form images. Ink droplets are ejected from the nozzles by applying energy to the ink to form the droplets.

The intermediate layers in microfluidic devices include flow passages that can be defined by openings, or features, having various shapes and sizes, depending on their functions within the device.

SUMMARY OF THE INVENTION

Fluid passages have been formed in structural layers of microfluidic devices by different techniques. For example, photosensitized materials have been used for structural layers defining fluid flow passages in ink jet print heads. Photolithographic techniques have been used to form these fluid passages. However, such photolithographic techniques are not completely satisfactory for at least the following reasons. First, photolithographic techniques require the use of photosensitized materials. Thus, the group of suitable materials that can be patterned by conventional photolithographic techniques is limited. Second, in order to form accurate features by conventional photolithography techniques, very thin layers have been used. For thicker layers, the accuracy of photolithography is reduced. Third, it has been difficult to pattern features having different depths and/or widths in a photosensitized material by photolithography.

Figure 1:
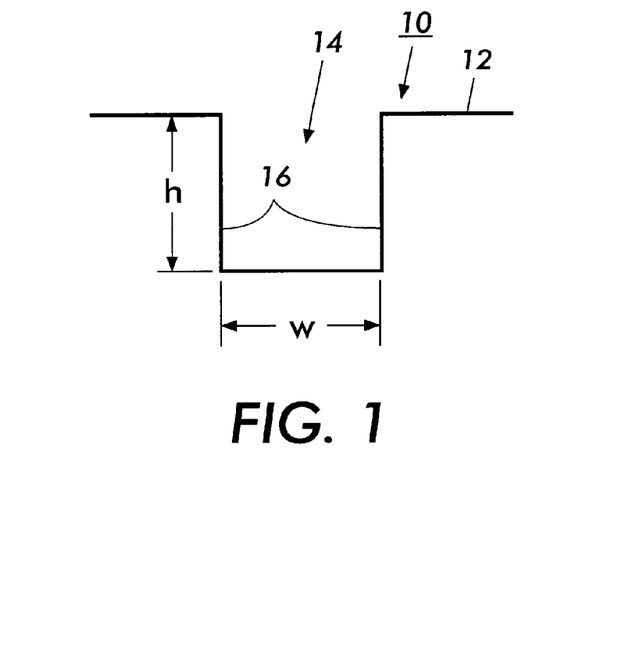
FIG. 1 illustrates an opening in a layer that includes vertical side walls.
Figure 2:
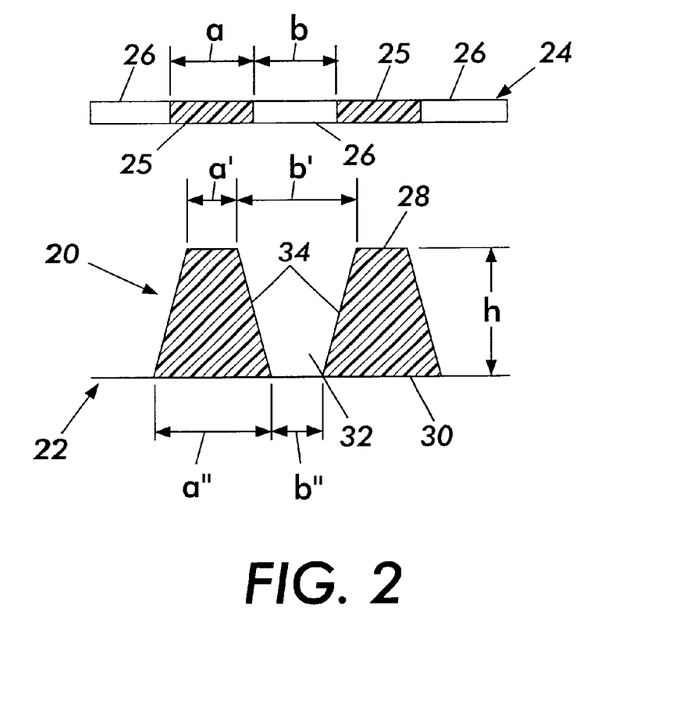
FIG. 2 illustrates a structure including an opening having inwardly tapered side walls formed on a substrate.

The features formed in a material can be characterized by their aspect ratio. The aspect ratio of a feature is determined by both its height and width. For a typical feature, however, there will also be a certain amount of taper of the side walls defining the feature. FIGS. 1 and 2 show two different opening configurations that have aspect ratios defined by respectively different relationships. FIG. 1 shows a layer 10 having a surface 12, and an opening 14 formed in the surface. The opening 14 has a height h and width w. The height h can be less than or equal to the thickness of the layer 10. The side walls 16 defining the opening 14 are perpendicular to the surface 12. For this opening configuration, the aspect ratio can be defined as the ratio of the height h to the width w of the opening; i.e.: h/w.

FIG. 2 shows a layer 20 formed on a substrate 22. The layer 20 has a thickness h and includes an upper surface 28, a lower surface 30, and an opening 32 extending between the upper surface 28 and the lower surface 30. The opening 32 is defined by side walls 34 which are tapered, such that the width of the opening 32 varies from a maximum width b' at the upper surface 28 to a minimum width b" at the lower surface 30. The layer 20 has a width a' at the upper surface 28 and a width a" at the lower surface 30. For the opening 32 having tapered side walls, the average aspect ratio of the opening 32 can be defined as: $2h/(b'+b")$. Likewise, the average aspect ratio of the wall between the openings can be defined as: $2h/(a'+a")$.

Structural layers in devices may require aspect ratios significantly greater than 1:1. In an ink jet print head, for example, features having aspect ratios significantly greater than 1:1, as well as features having significantly different aspect ratios, can be needed in different portions of the same device.

Conventional photolithography techniques have limited applicability for forming features that are tall, but narrow (i.e., have high aspect ratios) in thick photosensitized material layers. In addition, such techniques are unable to satisfactorily provide features having different heights in the same layer.

This invention provides methods for forming features in various different polymeric materials that can overcome the above-described disadvantages of known photolithographic techniques. Exemplary embodiments of the methods according to the invention can form fine features in non-photosensitized materials such embodiments can be used to form features in non-photosensitized materials that have not previously been achievable by known techniques. In addition, such methods can form fine features in non-photosensitized materials, for which photolithographic techniques are not suitable.

In addition, in exemplary embodiments of the methods according to the invention, fine features with high aspect ratios can be formed in non-photosensitized materials.

In addition, exemplary embodiments of the methods according to this invention can form features having different depths or widths in the same layer.

Furthermore, exemplary embodiments of the methods according to this invention can form features having different shapes and sizes in the same layer.

Thus, for example, in some embodiments, different portions of the same feature can have different depths, shapes and/or sizes. Accordingly, different portions of the same feature can provide different fluid flow characteristics. In addition, in some embodiments, different features can have different depths, widths, shapes and/or sizes in the same structural layer. Accordingly, different features of the same type can provide different fluid flow characteristics in the same structural layer. In addition, different types of features can be formed in the same structural layer to provide further versatility with respect to fluid flow.

Other exemplary embodiments of the methods according to the invention can form features in photosensitized materials by the combined use of laser ablation and photolithography. By combining these two different techniques, the patterning of features, or portions of features, that can be done by photolithography techniques can be performed by photolithography, while other features, or portions of the same feature, that previously have not been satisfactorily achieved in photosensitive materials by photolithography, can be formed by laser ablation. In embodiments, photolithography and laser ablation can be combined to form features in multi-layer structures including at least photosensitized material layer and at least one non-photosensitized material layer.

This invention also separately provides devices including such features.

BRIEF DESCRIPTION OF THE DRAWINGS

Various embodiments of this invention will be described in detail, with reference to the following figures, wherein.

DETAILED DESCRIPTION OF PREFERRED EMBODIMENTS

This invention provides methods that can form openings, or features, in both non-photosensitized and photosensitized materials. These materials can form portions of various devices.

Figure 3:
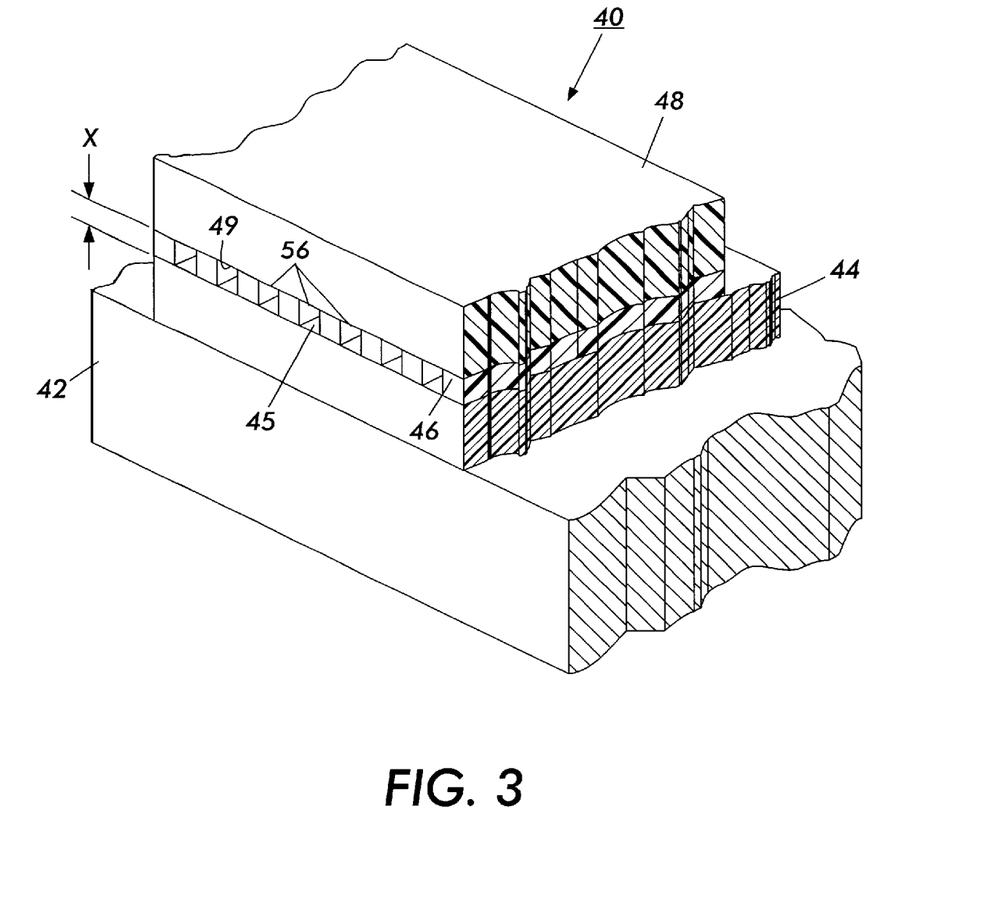
FIG. 3 illustrates an ink jet print head die module of an ink print head incorporating an exemplary embodiment of a patterned polymer layer according to the invention.

One exemplary device that includes openings, or features that can be formed according to the invention is an ink jet print head. FIG. 3 illustrates a portion of a thermal ink jet print head. The illustrated ink jet print head die module 40 mounted on a heat sink 42. The ink jet print head die module 40 comprises a base or heater plate 44, an intermediate layer 46 formed over the heater plate 44, and a cover or channel plate 48, formed over the intermediate layer 46.

The heater plate 44 includes heating elements (not shown) that are activated to heat ink contained in the ink jet print head die module 40, to cause ink droplets to be ejected from nozzles 56. The heater plate 44 can comprise any suitable substrate material, including, for example, silicon, quartz, glass or ceramics.

Figure 4:
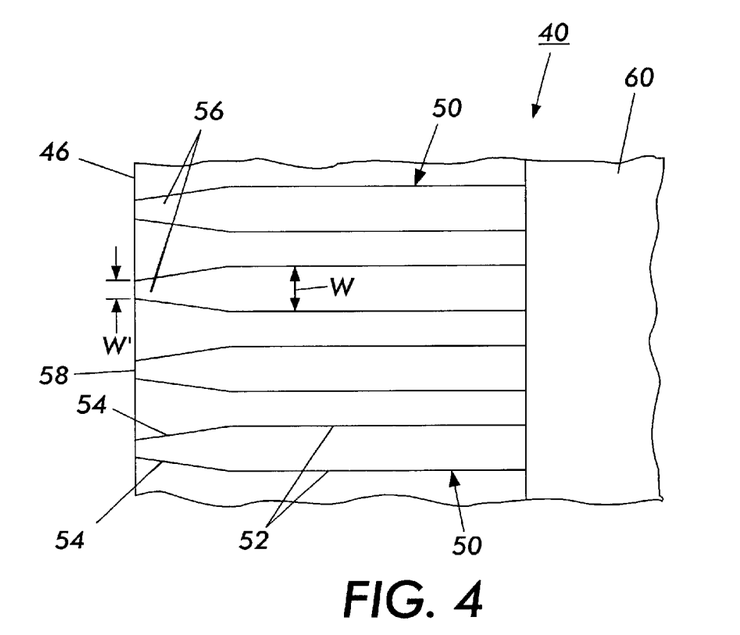
FIG. 4 illustrates an exemplary embodiment of a patterned polymer layer according to this invention.

The intermediate layer 46 has a thickness t. The intermediate layer can be formed of any suitable photosensitized or non-photosensitized material. Referring to FIG. 4, channels 50 are formed in the intermediate layer 46. The upper surface 45 of the heater plate 44 forms a floor of the channels 50. The channels 50 communicate with an ink reservoir 60 that contains a supply of ink. The channels 50 include a portion having parallel side walls 52, and a portion including non-parallel side walls 54. The side walls 54 define nozzles 56 having open ends 58. Ink droplets are ejected from the open ends 58 of the nozzles 56 during operation of the ink jet print head. The intermediate layer 46 includes features configured to control the flow of ink through the channels 50 and other flow passages of the ink jet print head die module 40.

The lower surface 49 of the channel plate 48 forms a top of the channels 50. The channel plate 48 can comprise any suitable material that is resistant to the ink. For example, the channel plate 48 can comprise glass, quartz, plastics, silicon, metals, polymers, and/or ceramics.

The channels 50 have a height H, which is measured perpendicular to the upper surface 45 of the heater plate 44. In the embodiment shown in FIG. 3, the channels 50 have a height H that equals the thickness t of the intermediate layer 46. In other embodiments, the height of the channels 50, as well as other features formed in intermediate layer 46, can be less than the thickness t.

As shown in FIG. 4, the channels 50 have a maximum width W at the portion of the channels defined by the side walls 52 and a minimum width W' at the open end 58. In accordance with the invention, the channels 50, and other features formed in the intermediate layer 46, can have high aspect ratios. For the channels 50, the aspect ratio is defined by the ratio of the height H to the width W, for embodiments in which the side walls 52, 54 are at least substantially vertical. The channels 50 have substantially constant width portions defined by the side walls 52. The angular range of the side walls 52, 54 is preferably substantially vertical (90°±5°). However, the side walls 52 and/or 54 can optionally be formed with tapered side walls.

The invention provides methods that can form improved features in both non-photosensitized materials and photosensitized materials. These materials can be formed on various different substrates. Furthermore, in multi-layer structures described below, non-photosensitized materials and photosensitized materials can be formed over each other. The features formed in the non-photosensitized materials and photosensitized materials can have various shapes and sizes. In some embodiments, the features can have fine dimensions, i.e., sub-micron and micron size dimensions. In addition, a wide range of feature sizes can be provided in both non-photosensitized materials and photosensitized materials. The features can have widths of from about 0.1 micron up to 1 mm or even higher. In preferred embodiments, the features have a width of at least about 1 micron. The features can also have heights, or depths, of from about 0.1 micron up to about 1 mm or even higher. In addition, as described below, the features can be formed with high aspect ratios.

According to the invention, the features can also have different heights or depths, as well as different aspect ratios, within the same layer. For example, in the intermediate layer 46 shown in FIG. 4, the aspect ratio of the channels 50 varies along the channel lengths. Particularly, the channels 50 have an aspect ratio that increases from that of the remainder of the channel 50 in the direction toward the open ends 58. In embodiments, the channels 50 can have an aspect ratio of at least about 5:1 in selected portions of the channels, such as the portion defined by the side walls 52. At the location of the open ends 58, the flow cross-sectional area is significantly reduced and the aspect ratio can be as high as at least about 10:1 at those locations.

In the ink jet print head die module 40 shown in FIG. 3, the droplet volume is essentially controlled by the size of the open ends 58. The required droplet volume for different fluids, such as different colored inks, can be achieved by changing the size of channel openings through which the different fluids respectively flow. The ability to form features having different aspect ratios enables the formation of channels having different sizes and shapes in the same intermediate layer 46.

Figure 5:
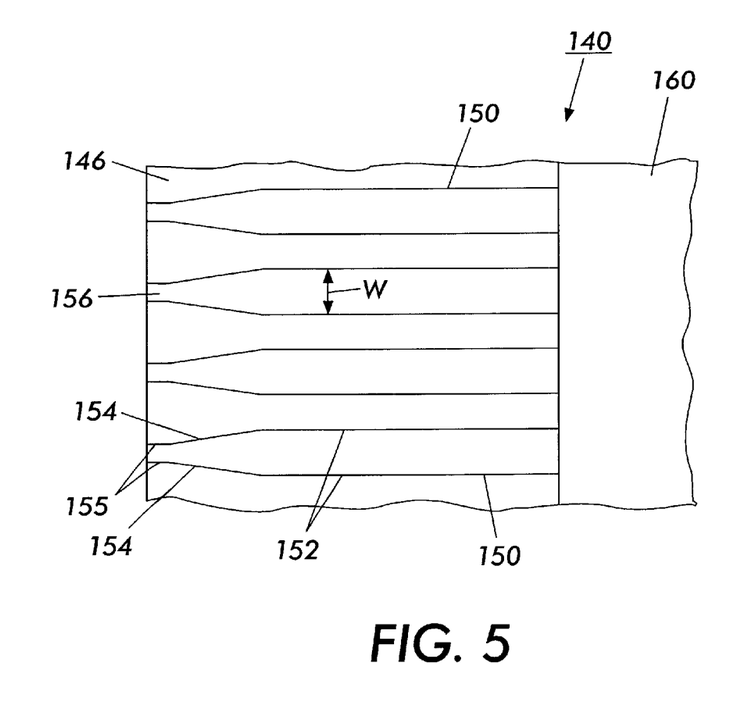
FIG. 5 illustrates another exemplary embodiment of a patterned polymer layer according to this invention.

FIG. 5 shows another exemplary embodiment of an intermediate layer 146 formed in an ink jet print head. In this embodiment, channels 150 are formed in the intermediate layer 146. The channels 150 each include a portion having parallel side walls 152, a portion having inwardly converging, non-parallel side walls 154, and a portion having parallel side walls 155 adjacent to the open ends 158. The side walls 154, 155 form nozzles 156.

In the intermediate layer 46, 146, the channels 50, 150 can have various different shapes and sizes. For example, the open ends of the nozzles can be square, rectangular, triangular, trapezoidal, circular or any other suitable shape. In addition, other types of features may be formed in the intermediate layer with various shapes and sizes.

According to the invention, the intermediate layer 46 can comprise any suitable polymeric material. The material forming the intermediate layer can be formed on any suitable substrate material, including, but not limited to silicon, quartz, glass, ceramics, metals and plastics. The invention provides methods of forming features in materials formed on such substrates. This invention further provides methods that can form features in a broad array of different material compositions, including non-photosensitized materials and photosensitized materials.

Exemplary embodiments of the methods according to the invention form entire features, or at least portions of features, in non-photosensitized polymeric materials by laser ablation techniques. Laser ablation can form features in thick non-photosensitized polymer layers, i.e., layers having a thickness of at least about 5 microns. For example, features can be formed in non-photosensitized polymeric materials having a thickness up to about 1000 microns. In some preferred embodiments, the non-photosensitized materials that are patterned have a thickness of from about 5 microns to about 250 microns. Polymeric materials having such a thickness can advantageously be formed as single layers in devices.

Laser ablation can be used to form features less than about 3 microns in size in non-photosensitized and photosensitized materials polymeric materials.

In addition, exemplary embodiments of the methods according to the invention can form such fine features having a high aspect ratio in non-photosensitized polymeric materials, including thick materials, by laser ablation techniques. For example, features having an aspect ratio of from about 5:1 to at least about 20:1 can be formed in thick non-photosensitized materials. In embodiments, high-aspect ratio features also can be formed in photosensitized, polymeric materials. The polymeric materials in which such features are formed can have a thickness of at least about 0.1 micron, and preferably from about 5 microns to about 50 microns.

In exemplary embodiments of the invention, laser ablation can be used to form entire features, or at least portions of features, that have different heights, or depths, in the same layer.

Other exemplary embodiments of the methods according to the invention can form features in photosensitized materials, such as photoresist materials. In such embodiments, entire features, or at least portions of features, in a layer can be formed by photolithography, and laser ablation can then be used for secondary patterning of the layer. Thus, features can be formed in photoresist materials by a combination of photolithography and secondary patterning by laser ablation. For example, in exemplary embodiments, one or more portions of a given feature can be formed by photolithography, and one or more other portions of that same feature can be formed by laser ablation. Accordingly, photolithography can be used to form entire features, or only portions of features, that can be readily formed in a photosensitized material layer by this technique. For example, photolithography can be used to form features, or portions of features, that have the same height in a photosensitized polymer layer, or features, or portions of features, that have a low aspect ratio, such as, for example, an-aspect ratio up to about 1:1.

Accordingly, by using both photolithography and laser ablation to form features in the same photosensitized polymer layer, the benefits of each respective technique can be combined to form features that could not previously be formed using conventional photolithography techniques alone.

In addition, in exemplary embodiments of the invention, multi-layer, patterned structures can be formed, that include at least one photosensitized polymer layer, and also at least one non-photosensitized polymer layer. For example, such structures can include a photosensitized polymer layer that is patterned by at least one of photolithography and laser ablation, and another non-photosensitized material layer that is patterned by laser ablation. The non-photosensitized layer (s) can be formed either under or over the photosensitized polymer layer(s). For example, in some embodiments, a photosensitized layer can be formed under and/or over an adhesive layer (i.e., a non-photosensitized material). It will be readily understood by those skilled in the art that other multi-layer, patterned structures that include at least one photosensitized polymer layer, also at least one non-photosensitized material layer, can also be formed by methods according to the invention.

In methods according to the invention that form entire features in non-photosensitized materials by laser ablation, various different non-photosensitized materials can be patterned. For example, suitable materials for forming the intermediate layer 46 of the ink jet print head die module 40 should be resistant to ink, have temperature stability and suitable rigidity, and be diceable. Because non-photosensitized materials can also be patterned, the methods according to the invention provide increased versatility with respect to the selection of polymeric materials that can be patterned and provide the above-described desired properties, as compared to known methods that can only utilize photosensitized materials.

Exemplary materials that can be patterned by laser ablation techniques according to the invention include, for example, adhesives, thermoplastics and thermoset plastics. An exemplary thermoset plastic is polyimide. Exemplary adhesives include, but are not limited to, epoxies, phenolics, acrylics, cyanoacrylates and methacrylates. Such adhesives that can be applied on substrates by, for example, spin coating, doctor blade coating, or film transfer techniques. Exemplary thermoplastics that can be coated and patterned according to the invention include, but are not limited to, polyester, polysulfone, polyetheretherketones and polyimides.

In embodiments of the methods according to the invention that utilize both photolithography and laser ablation to form features in the same layer, or in different layers of multi-layer structures, suitable photosensitized materials that can be patterned include, but are not limited to, materials that become polyimide, polyarylene ether ketone, Vacrel, or bisbenzocyclobutene or polymethylmethacrylate when cured. Such photoresist materials can be applied to any suitable substrate by any suitable technique. For example, photosensitized materials can be applied by coating. The photosensitized material (photoresist) used to form the intermediate layer 46 can be either a positive working resist or a negative working resist.

As stated, entire features, or portions of features, can be formed in non-photosensitized and photosensitized polymer layers by laser ablation. Any suitable laser can be used, including, but not limited to, solid state lasers such as Nd:YAG (neodymium:yttrium aluminum garnet) lasers and their harmonics at shorter wavelength, ultraviolet lasers such as excimer lasers, free electron lasers, gas discharge lasers, such as argon ion or krypton ion lasers or copper vapor lasers, infrared lasers such as RF (radio-frequency discharge) $CO_2$ lasers or TEA (transverse electric discharge-atmospheric pressure) $CO_2$ lasers, and the like.

The specific selection of a laser source will depend on the composition and physical properties of the polymer material being processed, the thickness of the polymer layer, the required spatial resolution, the desired surface quality, and economic considerations such as power consumption, equipment cost, maintenance cost and processing speed. For example, excimer lasers offer fine resolution, about 2 microns to about 5 microns and a heat-affected zone of less than about 2 microns.

Figure 6:
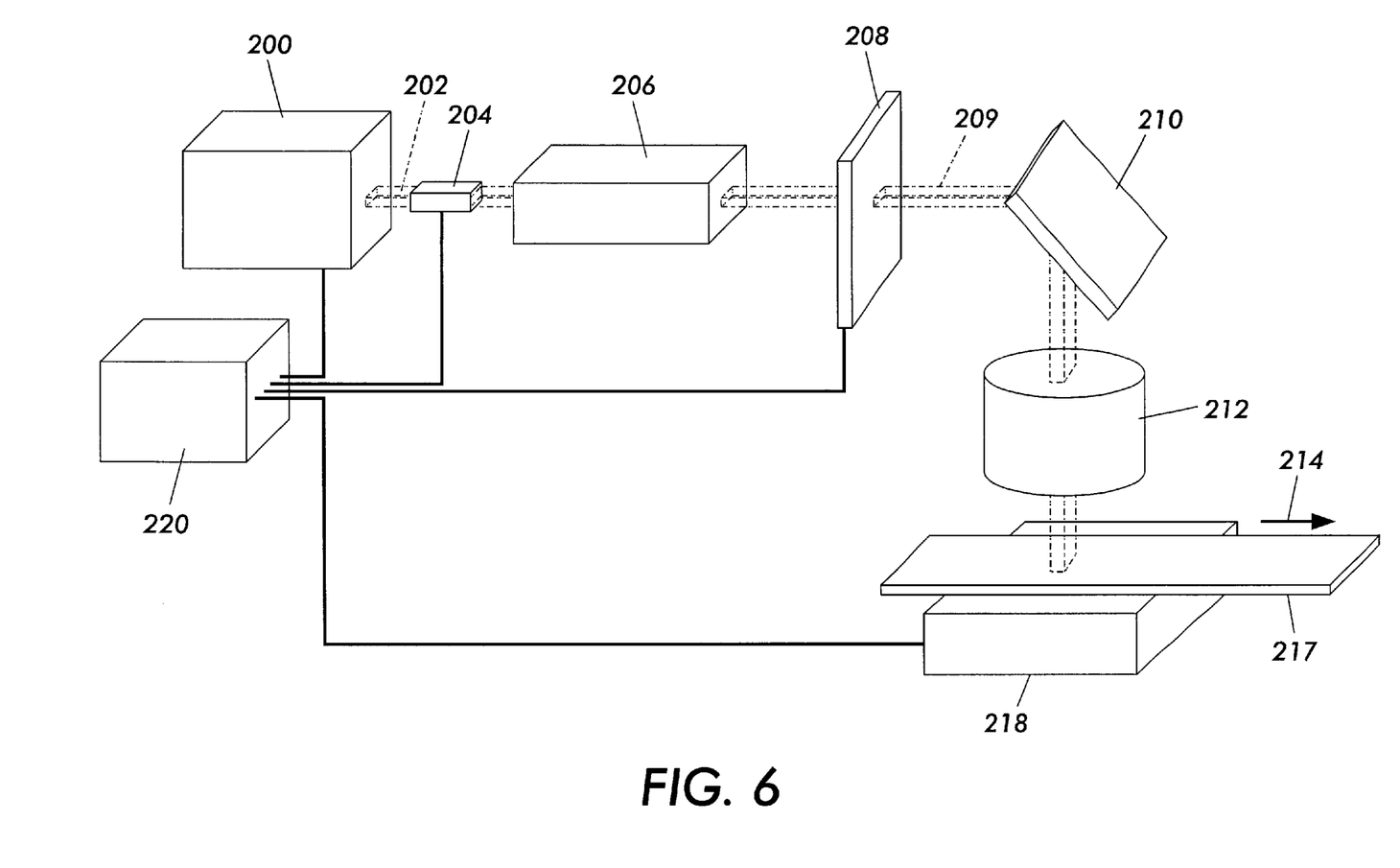
FIG. 6 is a perspective view of an imagewise ablation apparatus.

In exemplary embodiments of the methods of this invention, the choice of the laser ablation method depends on the specific characteristics of the laser and the material processing parameters required. A preferred technique is the imagewise ablation method. The imagewise ablation method is most appropriate for short pulse and relatively low frequency (<1 kHz) gas discharge lasers, such as excimer and TEA $CO_2$ lasers. Referring to FIG. 6, in this cutting system, the laser source 200 emits a laser beam 202, which is processed through a variable attenuator 204 and beam shaping stage 206. The laser beam 202 is imaged onto a mask 208 containing the pattern of the features (not shown). The patterned laser beam is then deflected by a deflecting mirror 210 and passes through a lens 212, after which the illuminated mask is imaged onto a polymer layer 217. The polymer layer 217 can be, for example, the intermediate layer 46 formed on the channel plate 44 shown in FIG. 3. The polymer layer 217 is supported on a stage 218. In this exemplary embodiment, the polymer layer 217 is transported in the direction of the arrow 216, typically in a step-and-repeat manner.

In this embodiment, the laser source 200, variable attenuator 204, mask 208 and the stage 218 are each connected to a controller 220. Further, the mask 208 can be moved in the x- and y-directions by one or more actuators (not shown).

The laser beam 202 illuminates the mask 208 and forms a laser light image of the region to be ablated on the polymer layer 217. An appropriate number of pulses from the laser source 200 can remove unwanted material from the polymer layer 217. One or more passes can be used to etch the polymer layer 217 to selected depths at different locations of the polymer layer 217. For example, in some embodiments, the polymer layer 217 can be etched through its entire thickness, i.e., to the underlying substrate, such as the channel plate 44. In other embodiments, the polymer layer 217 can be etched to a selected depth that is less than the thickness of the polymer layer 217 at selected regions of the polymer layer 217.

Alternatively, in other exemplary embodiments, an illumination and imaging system can be provided that images the desired features in a single die, in a single imaging process.

Another suitable technique for forming features in polymer layers according to the invention is the flying spot scanning technique. This technique is most appropriate for CW or high frequency pulsed lasers such as the RF $CO_2$ and Nd:YAG lasers. In this method, shown generally in FIG. 7, a laser beam 300 emitted from a laser source (not shown) passes through a beam expander 302. The expanded laser beam reflects from a first deflecting mirror 304 that is operatively connected to an x-axis scanner 306, and a second deflecting mirror 308 that is operatively connected to a y-axis scanner 310. The reflected laser beam is then focused to a tight spot by a f Θ flat field scanning lens 312.

Figure 7:
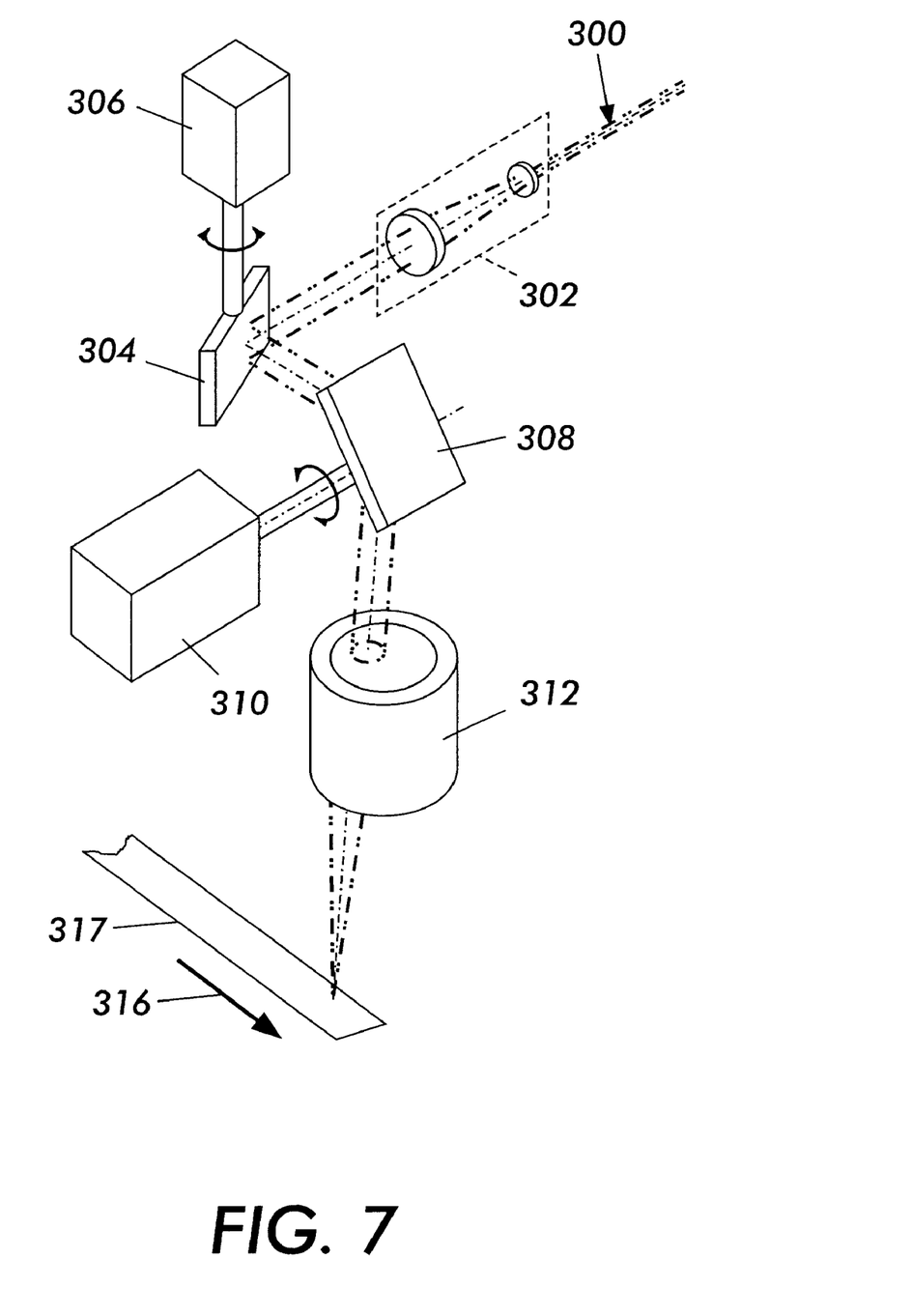
FIG. 7 is a perspective view of a flying spot scanning cutting apparatus.

The focused laser beam spot 300 is scanned by the mirrors 304 and 308 onto a polymer layer 317, which is moved in the direction of arrow 316. As a result, the laser beam 300 cuts desired features in the polymer layer 317. By properly controlling the scanning speed and the laser power, the cut depth of the features can be selected.

In a modification of the flying spot method, which is not shown, but will be readily apparent to those skilled in the art, the laser beam is stationary and the polymer layer 317 is moved along two axes parallel to the plane of the polymer layer 317.

To perform the laser ablation process according to this invention, the energy characteristics of the laser source are usually adjusted to provide the desired penetration depth and cutting properties. For example, in exemplary embodiments where a KrF excimer laser operating at 248 nm is used as the laser source, the laser can effectively and precisely cut a polymer layer having a thickness of from about 0.1 microns to about 1000 microns, and preferably a thickness from about 5 microns to about 250 microns. The energy density used to cut such layers can be from about 0.3 $J/cm^2$ to about 30 $J/cm^2$, and is preferably from about 0.5 $J/cm^2$ to about 1.5 $J/cm^2$. Increasing the energy density will increase the aspect ratio that is achievable, with other factors remaining constant.

Furthermore, it will be readily recognized that the laser processing parameters may be adjusted within broad ranges to account for the specific properties desired, the polymer materials being patterned, the laser power, and method. For example, the specific laser ablation process parameters, such as fluence, intensity, and cutting speed will depend upon such factors as wavelength and type of the laser, rate of irradiation, pulse width, energy level, and the like. Based on this disclosure one skilled in the art can select such processing parameters for a specific material to be cut.

In the exemplary embodiment of the ink jet print head die module 40 shown in FIG. 3, the channels 50 extend from the lower surface 49 of the channel plate 48 completely through the thickness of the intermediate layer 46, i.e., to the top surface 45 of the heater plate 44. In some exemplary embodiments, the channels 50 are formed entirely by laser ablation, preferably in non-photosensitized materials.

The wider portions of the channels 50 defined by the side walls 52 have a lower aspect ratio than the nozzles 56. The portions of the channels 50 defined by the side walls 52 are preferably formed by photolithography, while the nozzles 56 are preferably formed by laser ablation. By combining both techniques, fine nozzles 56 can be accurately and consistently formed in polymer materials. By forming smooth and uniform nozzles, correct drop volume, uniform drop volume and good directionality can be achieved.

Figure 8:
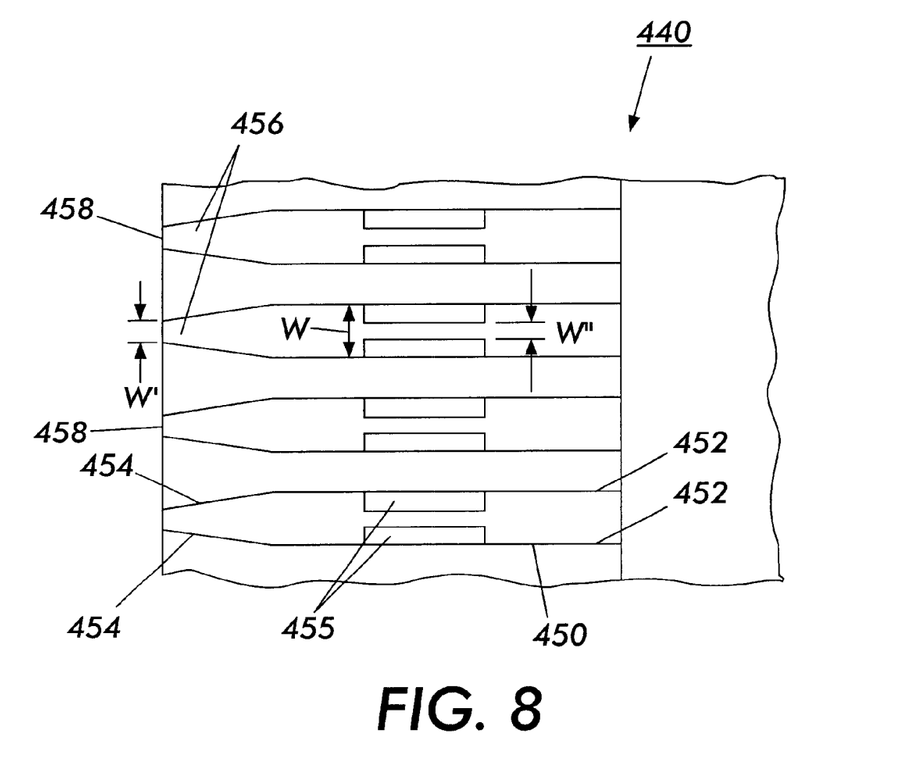
FIG. 8 illustrates another exemplary embodiment of a patterned polymer layer according to this invention.

Exemplary embodiments of the methods according to this invention can also be used to form features that extend through only a portion of the thickness of polymer layers, to form lines, trenches or other like features. Such embodiments are particularly advantageous for non-photosensitized materials. For example, FIG. 8 shows another exemplary embodiment of a patterned layer including channels 450, which include wide portions having parallel side walls 452, a narrow portion having side walls 455 and connecting the wide portions to each other, and a front portion including non-parallel side walls 454, which define nozzles 456 having open ends 458 for injecting ink. As shown, the sidewalls 452, 455 and 454, respectively, define a maximum width W, a minimum width W" and an intermediate width W', of the channels 450. The wide portions and the narrow portions of the channels can have different depths with respect to each other. In addition, the front portion can have a depth that differs from that of the wide portions and/or narrow portions.

According to the invention, different portions of the same channels 450 can extend entirely, or only partially through, the thickness of the polymer layer. That is, different portions of the same channels can have different vertical heights or depths relative to each other. These different portions can also have different widths relative to each other. For example, the narrow portion of the channels 450 defined by the side walls 455 can have a depth that is less than the thickness of the polymer layer (i.e., the narrow portions do not extend to the upper surface of the underlying substrate), while the widest portions of the channels 450 defined by the side walls 452 can have a greater depth than the narrow portion. For example, the widest portions of the channel can have a depth equal to the thickness of the polymer layer. In this manner, the narrow portion of the channels 450 can connect the widest portions of the channel to control fluid flow in the channels 450. In addition, the narrow portions of the channels 450 can have different widths and different depths in the same polymer layer, in order to provide different, controlled fluid flow characteristics in different channels of the same polymer layer.

Furthermore, although the patterned polymer layers according to the invention have been described above with respect to thermal ink jet print heads, it will be readily understood by those skilled in the art that patterned photo-resist layers can be formed in other types of ink jet print heads, such as acoustic ink jet print heads, piezoelectric printheads, and other print heads that eject materials (liquid/solid blends/mixtures/combinations, solids that are in liquid phase when ejected, and the like), using methods according to the invention.

In addition, the patterned non-photosensitive and photosensitive material layers formed according to this invention can be incorporated in various other types of micro-fluidic devices that would benefit from having one more such layers including different types of features, features with high aspect ratios, features having different aspect ratios and/or features with controlled shapes. Such devices include, but are not limited to, micro-analytical devices and biomedical devices, in which controlled fluid flow is needed.

While the invention has been described in conjunction with the specific embodiments described above, it is evident that many alternatives, modifications and variations are apparent to those skilled in the art. Accordingly, embodiments of the invention as set forth above are intended to be illustrative and not limiting. Various changes can be made without departing from the spirit and scope of the invention.

What is claimed is:

1. A method of forming features in a polymer layer, comprising:
   irradiating a polymer layer formed on a substrate with an ablation laser to form at least one feature that is parallel to the plane of the polymer layer;
   wherein the polymer layer comprises a non-photosensitized material;
   wherein the substrate comprises a material selected from the group consisting of silicon, quartz, glass, ceramics and metals; and
   wherein the at least one feature has (i) a width of from about 2 microns to about 1000 microns, and (ii) a height of from about 0.1 micron to about 1000 microns.

2. The method of claim 1, wherein the at least one feature has an aspect ratio of at least about 5:1.

3. The method of claim 1, wherein the polymer layer has a thickness of at least about 1 micron.

4. The method of claim 3, wherein the polymer layer has a thickness of at least about 5 microns.

5. The method claim 1, wherein the at least one feature is a portion of a channel.

6. The method claim 1, wherein the at least one feature comprises a plurality of features.

7. A method of forming features in a polymer layer, comprising:
   irradiating a polymer layer formed on a substrate with an ablation laser to form a plurality of features that are parallel to the plane of the polymer layer;
   wherein the polymer layer comprises a non-photosensitized material;
   wherein the substrate comprises a material selected from the group consisting of silicon, quartz, glass, ceramics and metals;
   wherein at least one of the features has (i) a width of from about 2 microns to about 1000 microns, and (ii) a height of from about 0.1 micron to about 1000 microns; and
   wherein at least two of the features have a different height from each other.

8. The method of claim 7, wherein the at least one feature has an aspect ratio of at least about 5:1.

9. The method of claim 7, wherein the polymer is an adhesive.

10. The method of claim 7, wherein the polymer layer has a thickness of at least about 10 microns, and the at least one feature has an aspect ratio of at least about 10:1.

11. The method of claim 7, wherein the polymer layer has a thickness of at least about 5 microns.

12. The method claim 7, wherein the features are each at least a portion of a channel.

13. The method claim 7, wherein the features are a plurality of channels.

14. A method of forming features in a polymer layer, comprising:
   forming a first portion of at least one feature in a polymer layer formed on a substrate by photolithography, the polymer layer comprising a photosensitized material; and
   irradiating the polymer layer with an ablation laser to form a second portion of each at least one feature that is parallel to the plane of the polymer layer;
   wherein the first portion and the second portion of at least one feature have a different size from each other.

15. The method of claim 14, wherein the first portion and the second portion of each feature have a different height in a thickness direction of the polymer layer from each other.

16. The method of claim 14, wherein the second portion is a nozzle.

17. The method of claim 14, wherein the polymer layer has a thickness of at least about 5 microns, and the second portion of each feature has an aspect ratio of at least about 5:1.

18. The method of claim 14, wherein the polymer layer has a thickness of at least about 10 microns and the second portion of each feature has an aspect ratio of at least about 10:1.

19. The method of claim 14, wherein:

the substrate comprises a heater wafer of an ink jet print head; and the method further comprises forming a cover over the polymer layer; wherein the features form ink flow passages in the ink jet print head.

20. The method of claim 14, comprising:

forming a first portion of each of at least a first feature and a second feature in the polymer layer by photolithography; and irradiating the polymer layer with an ablation laser to form a second portion of each of at least the first feature and the second feature in the polymer layer, wherein the second portion of the first feature has a different height in a thickness direction of the polymer layer from at least one of (i) the first portion of the first feature, (ii) the first portion of the second feature, and the (iii) the second portion of the second feature.

21. The method of claim 20, wherein the second portion of the first feature has a different height from the first portion of the first feature.

22. The method of claim 20, wherein the second portion of each feature is a nozzle.

23. The method of claim 20, wherein the polymer layer has a thickness of at least about 5 microns, and the second portion of each feature has an aspect ratio of at least about 5:1.

24. The method of claim 20, wherein the polymer layer has a thickness of at least about 10 microns and the second portion of each feature has an aspect ratio of at least about 10:1.

25. The method of claim 20, wherein:

the substrate comprises a heater wafer of an ink jet print head; and the method further comprises forming a cover over the polymer layer; wherein the features form ink flow passages in the ink jet print head.

26. A method of forming features in a structure, the structure including a substrate, and a first polymer layer comprising a non-photosensitized material and a second polymer layer comprising a photosensitized material formed over the substrate, the method comprising:

irradiating the first polymer layer with an ablation laser to form a plurality of first features that are parallel to the plane of the first polymer layer;

forming a first portion of each of a plurality of second features in the second polymer layer by photolithography; and irradiating the second polymer layer with the ablation laser to form a second portion of each of the plurality of second features that are parallel to the plane of the second polymer layer, wherein the first portion and the second portion of at least one second feature in the second polymer layer have a different size from each other.

27. The method of claim 26, wherein the first portion and the second portion of each second feature have a different height in a thickness direction of the second polymer layer from each other.

28. The method of claim 26, wherein the second portion of each second feature is a nozzle.

29. The method of claim 26, wherein the second polymer layer has a thickness of at least about 5 microns, and the second portion of each second feature of the second polymer layer has an aspect ratio of at least about 5:1.

30. The method of claim 6, wherein the second polymer layer has thickness of at least about 10 microns, and the second portion of each second feature has an aspect ratio of at least about 10:1.

31. The method of claim 26, wherein:

the substrate comprises a heater wafer of an ink jet print head; and the method further comprises forming a cover over the first polymer layer and second polymer layer;

wherein the features form ink flow passages in the ink jet print head.

* * * * *